Sept. 18, 1945.　　F. H. AVERS ET AL　　2,385,183
STEREOSCOPIC PHOTOGRAPHY
Filed June 6, 1942　　　4 Sheets-Sheet 1
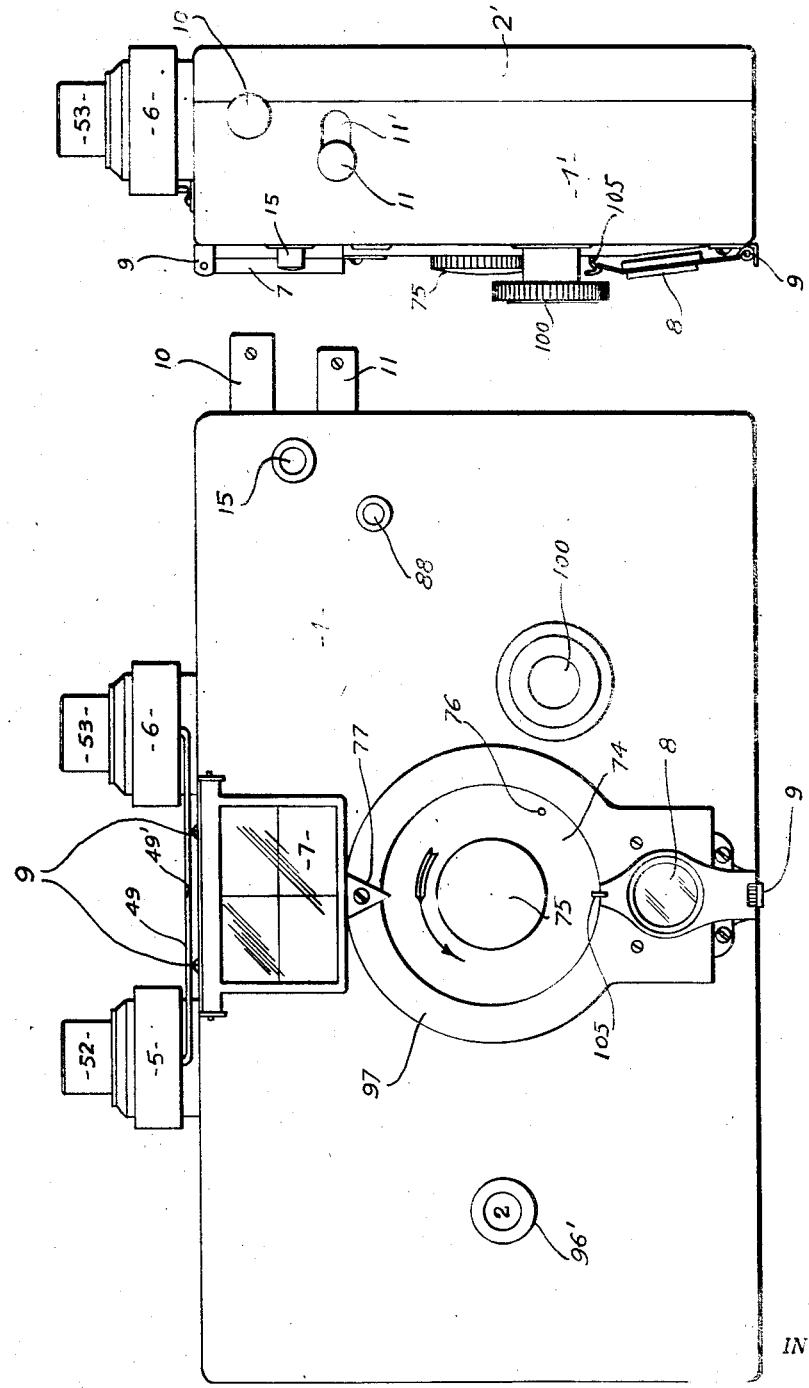
INVENTORS
FRANKLIN H. AVERS
EDWARD C. KREBS
BY
Charles L. ...

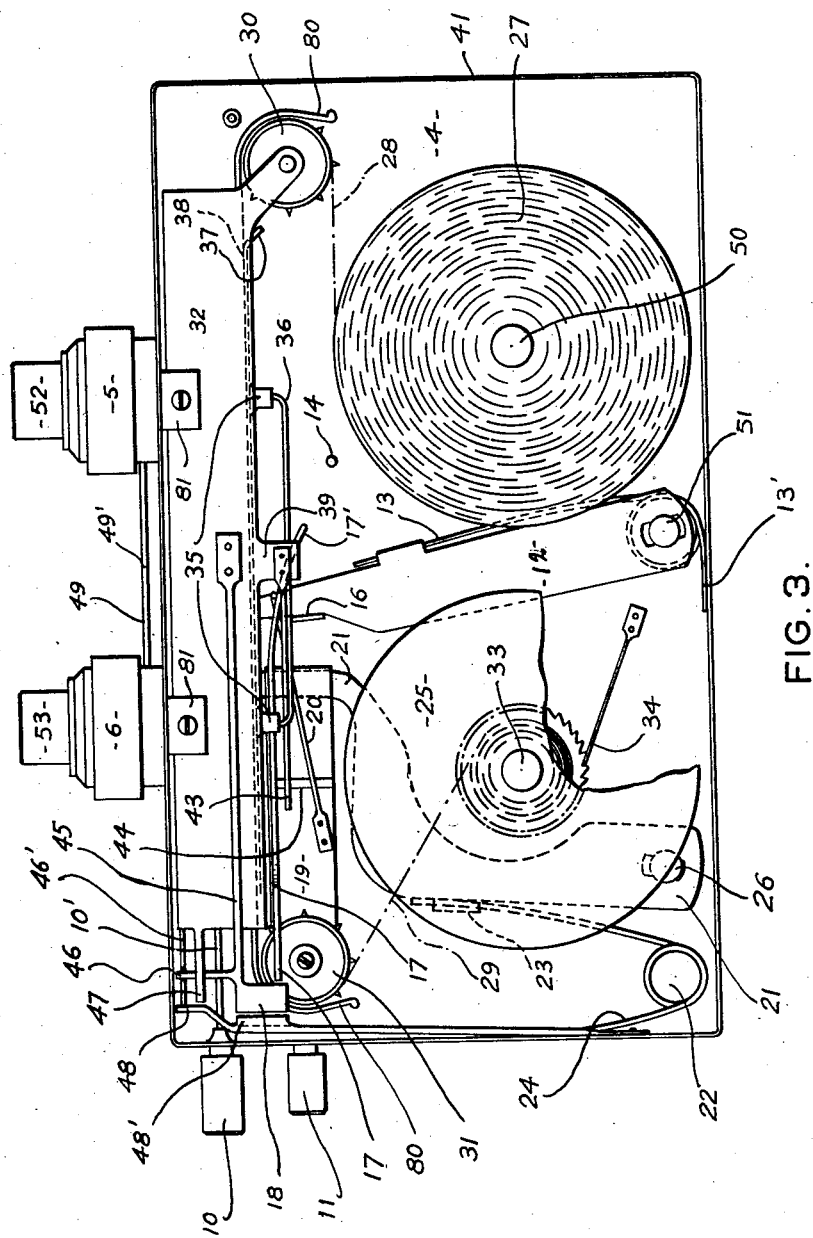

Sept. 18, 1945.  F. H. AVERS ET AL  2,385,183
STEREOSCOPIC PHOTOGRAPHY
Filed June 6, 1942  4 Sheets-Sheet 3
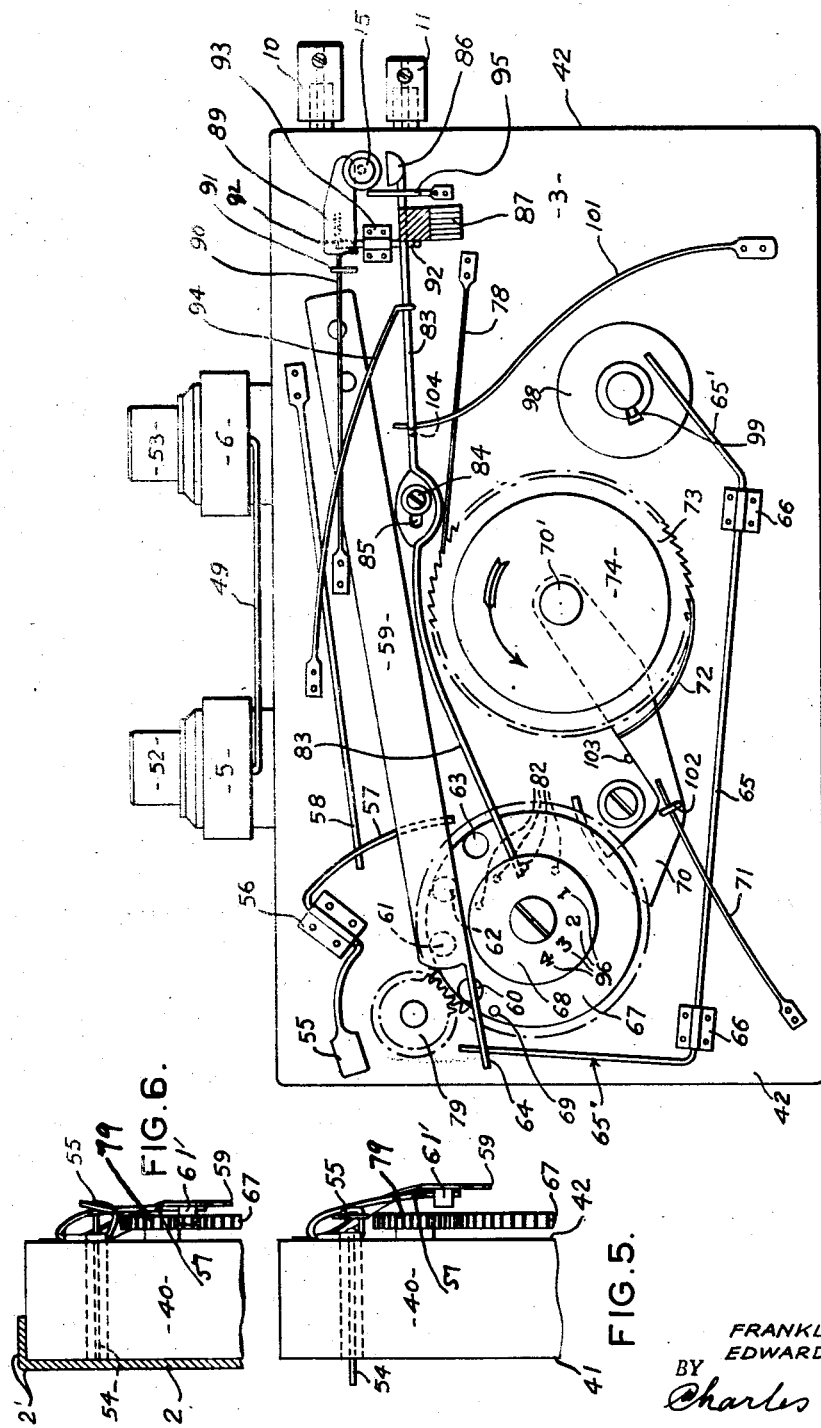
INVENTORS
FRANKLIN H. AVERS
EDWARD C. KREBS
BY Charles A. Darius
ATTORNEY Sept. 18, 1945.   F. H. AVERS ET AL   2,385,183
STEREOSCOPIC PHOTOGRAPHY
Filed June 6, 1942   4 Sheets-Sheet 4

INVENTORS
FRANKLIN H. AVERS
EDWARD C. KREBS
BY
Charles A. Darius
ATTORNEY

Patented Sept. 18, 1945

2,385,183

UNITED STATES PATENT OFFICE 2,385,183

STEREOSCOPIC PHOTOGRAPHY

Franklin H. Avers and Edward C. Krebs, Portage, Wis., assignors to George P. Krebs, as trustee Application June 6, 1942, Serial No. 446,048

5 Claims. (Cl. 95—18)

The present invention relates to improvements in the art of taking, mounting, and viewing photographic stereo pictures, and to means for practicing the same.

It is an object of the present invention to make pairs of simultaneous exposures on a single ribbon film at spaced intervals on the same film through twin lenses, and distanced from each other so as to attain sufficient optical angular difference of view for stereoscopic perspective.

Another object is to provide convenient and effective means for taking such binocular pictures, and which make it possible to utilize standard cinema ribbon films (especially such as are intended for amateur color work, e. g. "Kodachrome" films) and whereby it is possible to take a large number of stereo doublets upon the same film until the entire roll has been exhausted.

A further object is to provide means in camera mechanism for differentially advancing a continuous ribbon film so as to present new unexposed film space, after each "shot," in preparation for the next pair of distanced pairs of exposures, and thus to avoid any substantial wastage of film and to avoid double exposure of a portion of the film which has already been exposed to a twin lens.

Another object of the invention is to make it possible, after the film has been developed and processed, to cut the ribbon into strips of appropriate length to include a given number of pairs of companion pictures and so that they may be appropriately mounted or framed on slides for convenient viewing by a suitable binocular device for this purpose.

It is a still further object to provide, as a separate unit of the system, a stereoscope adapted for viewing such slides as illuminated transparencies.

Further more specific objects and means provided for carrying out the objectives of the invention will be better understood by reference to the accompanying drawings which constitute a part of this specification. They illustrate one coordinated preferred form of mechanisms and instrumentalities for taking, producing, and utilizing stereoscopic views of the kind herein disclosed.

Broadly, the invention then embraces a portable box-camera with twin lenses, suitable for amateur as well as professional use; the adaptation of the same for the utilization of standard ribbon cinema films, including such as are provided for cinema color-photography; a novel manner of mounting such films upon slides to present a multiplicity of scenes in stereo-doublets on one slide; and novel means for convenient and effective stereoscopic viewing.

In the conventional moving-picture camera, the ribbon film usually runs a vertical course behind a single lens, while successive exposures are made in rapid succession; each "frame" being immediately subjacent to that of the preceding related view, and with the altitude of the scenes generally lying in the same direction as the linear course of the ribbon film.

Herein, the course of the ribbon is in horizontal relation to the view, and every point passes successively behind first one and then the other of appropriately spaced twin lenses. The several stereo scenes are thus "taken" in pairs with the altitude of the scene transverse to the linear dimension of the ribbon. The related scenes of each twin exposure do not lie in adjacent frames, but are spaced at distances related to the distance between the twin lenses.

To avoid wastage of the intervening stretch of unexposed film between pairs, provision is made for advancing the ribbon a certain calculated "short" distance (one "frame") after each "take," and until all blank film space between the exposure fields of the two lenses has been exposed. When, by a further advance of the film by the distance of one "frame," one of the doublet stereo-views already recorded by one of the lenses would impinge upon the exposure field behind the other lens, and in order to avoid double exposure through the second lens, the forward movement of the film is then enhanced to such a degree so that all of the frames previously exposed behind the first lens, will bypass the second lens aperture and diaphragm and until fresh, unexposed film lies in the exposure field of both lenses. Provision is therefore made then to advance the film for a certain calculated "long" distance, and far enough to carry all the exposed "frames" of the first lens past the second. This will be better understood by reference to the drawings especially Fig. 4, wherein there is depicted mechanism illustrative of means adapted for advancing the film for such a series of "short" distances, for a given number of exposures, and then for advancing the film for one "long" distance, thus alternating the advance of the ribbon by a given number of "short" and one "long" distance, and so on until the roll of film has been exhausted if so desired. The actual measured distance may be made to depend upon the results desired and the size and style of the film to be employed.

It has been found most convenient and serviceable for all around amateur practice, to utilize the standard 50 foot 16 m. m. sprocket-holed cinema film, when the individual dimensions of each picture will be roughly about $\frac{7}{16}''$ high and $\frac{7}{16}''$ wide, the distance between centres of adjacent frames about $\frac{1}{8}$ to $\frac{5}{8}$ of an inch, and the distance between the centres of each stereo pair about $2\frac{1}{2}''$ when the focal centres of the lenses are also about $2\frac{1}{2}''$ apart. Under these conditions two series of four related stereo doublets may be taken (as illustrated in Fig. 7), by successively exposing the next adjacent unexposed "frame," after advancing the film by three "short" distances. Thereafter the film is advanced for the "long" distance, in this illustration equal to five "short" distances.

When the method is to be applied to another standard or other size of movie film, such as 8 m. m. or 35 m. m., modification will have to be made in the means as exemplified, not merely in dimensional respects, but also in the structural elements. Thus for instance, the ratio of movements for the series of short distances to those for the intermittent long distances, will have to be readjusted. This will, for instance, necessitate some alterations in structure in the film-advancing mechanism, in the system involving the relative dimensions and the interrelation of the parts 60, 61, 62, 63, 67, 79, 82, and 96. These and other adaptations will however be obvious and may be readily achieved from the disclosures based upon the illustrations herein directed to the 16 m. m. standard movie film.

The preferred form of camera to be used for taking the stereo pairs of pictures in the manner described consists of an oblong box housing with horizontally disposed twin lenses with their mountings placed at one of the long sides of the camera box and having their focal centers about $2\frac{1}{2}''$ apart.

With these fundamental measurements, the relative dimensions of the other camera parts and of the adjuvant parts and mechanisms, such as the mounted slides, and the correlated stereoscope, can also be readily determined, depending upon the size, style of film, and other conditions.

Accordingly, in the exemplified case, the "short" distance will be equal to the width of one "frame" and the "long" distance equal to the sum of the width of four exposed frames plus one frame for fresh exposure. In this manner of operation, the film, after being developed and printed or processed, according to the kind of film employed, may then be cut conveniently into strips containing the required number of spaced stereo pairs and thereafter suitably mounted upon slides, as in Fig. 7, for viewing through a correspondingly adapted bifocal stereoscope as illustrated in Fig. 8.

A specific and preferred embodiment of the principles and structures involved is set forth in the drawings. In presenting these drawings, the applicants do not intend to limit themselves to the precise details of structure as exemplified, for it will be obvious to those skilled in the photographic art that various particular elements of the apparatus described may be differently disposed, omitted, or replaced by either mechanical or functional equivalents without departing from the scope and essence of the invention. In the drawings, consisting of 9 figures, like indices of reference indicate like parts.

In these drawings:

Fig. 1 presents in outline the plan view of the top portion of the outside box cover of the camera when in horizontal "taking" position.

Fig. 2 presents a similar on-end view of the right hand side of the camera box as it is shown in Fig. 1, with operative parts protruding, as shutter-set knob 10 and time-set knob 11; 11' is a cut-out in the side of the cover of the camera-housing to give play-room for the protruding part of the time-set operating mechanism when the cover (1, 1') is to be separated from the lower part of the camera-housing (2').

Fig. 3 illustrates in outline a supporting frame which is in the form of a shallow oblong pan. This view presents the hollow aspect of the supporting frame into which various operating and structural members, such as film feed roll 27, film track 38, exposure chamber 32, take-up reel 25, and others as will further appear, are sunk and mounted. When the camera is in normal horizontal operating position, the pan-frame shown in this figure is inverted.

Fig. 4 shows the reverse side of the supporting frame depicted in Fig. 3 completely turned over end on end, and thus with the relative right and left hand sides of the views shown, in transposed position.

Figs. 5 and 6 are two fragmentary plan views of the left-hand side end of the supporting frame as it is shown in Fig. 4 and showing some members in different operative position. Fig. 6 being shown with, and Fig. 5 without, the lower section 2' of the camera box shown in Fig. 2 in place.

Figure 7:
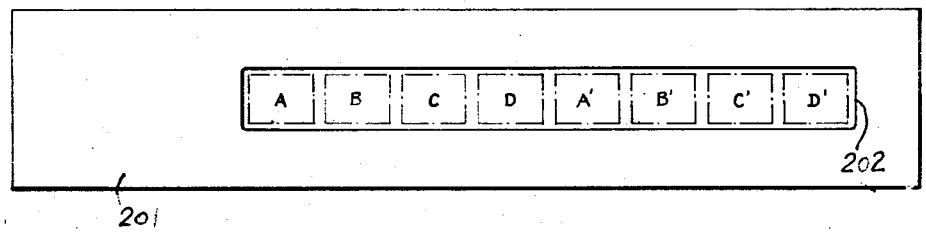

Fig. 7 diagrammatically depicts a slide in which are mounted a multiplicity of stereoscopic pairs of transparencies derived from a twin-lens camera constructed in accordance with the principles of operation of the mechanisms illustrated in Figs. 1, 2, 3, and 4.

Figure 8:
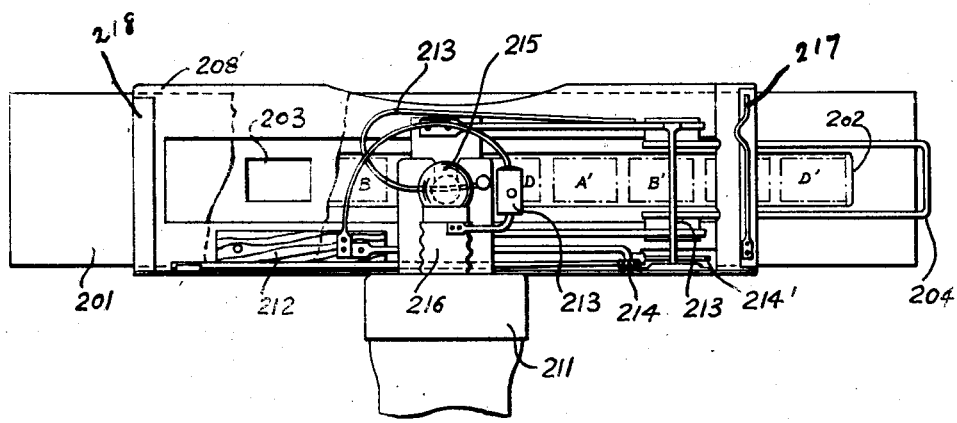
Figure 9:
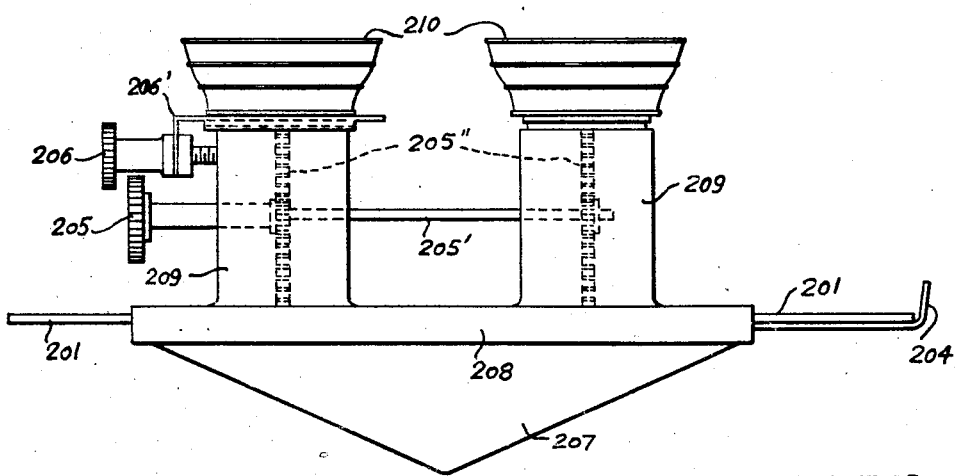

Figs. 8 and 9 present different aspects of a form of stereoscope adapted for viewing transparent slides of the type illustrated in Fig. 7.

In operation of the assembled mechanism of the box camera, the unexposed film 28 is fed from its supply spool 27 on a spindle 50. The film being preferably of the conventional movie type, with sprocket holes, is carried into engagement with sprocket wheel 30, (optionally assisted in retaining its position by a light-pressure guide spring 80), and along the film track into the interior of and through the exposure chamber 32 (interior not shown). After exposure therein, the exposed film 29 passes over a second sprocket wheel 31, and is carried to a take-up spool 25 (shown in fragment) turning upon its axle 33 to which the spool is removably keyed. This axle is also provided with a ratchet wheel and click-pawl 34 to prevent retrograde motion of the spool.

In its course through the exposure chamber, the sensitized surface of the ribbon of film 28—29 lies in a position normal to the plane of vision through the twin lenses 52—53, and passes, successively behind each of the two lens tubes, in a horizontal line equidistant from each lens. After passing behind both lenses, the then exposed film 29 passes over the sprocket wheel 31 to the take-up spool 25, as previously explained.

This take-up spool 25 is operated manually by a knurled knob 100 (Figs. 1 and 2), to wind up the exposed film 29 on the spool. The shank of knob 100 is set into a cylindrical sleeve 99 which arises from the movable flange-disk 98 and is integral therewith, and is held in firm position by the setscrew shown as a part of the cylindrical sleeve 99. The flange-disk 98 and sleeve 99 are in turn slidably splined upon the axle 33 of take-up spool 25, where this axle is journaled into the supporting frame 4 (Fig. 3) and protrudes through the other side 3 (Fig. 4) of that frame. Thus the knob 100 may be pulled upwardly which will then also cause the circular flange-disk 98 to move in the same direction upon its slidable bearing on 33 and thus act upon the two lever arms 65' and 65'' of lever 65 which is fulcrumed at 66. This upward pull on the knob 100 and of the circular flange-disk 98, through the movement of these two lever arms 65' and 65'', acts upon the prong 64 extending from the free end of a lock-spring 59.

This lock-spring 59 is provided, near its free end, and where it rests upon the cog-wheel 67, with a lock-pin 61' which, as shown in Fig. 4, is depicted as in locking engagement with the second of a series of four holes or depressions 60—62, and 63. When the lock-pin of the lock-spring 59 is thus engaged, the film advancing mechanism is immobilized. By referring to Figs. 4 and 3 (the latter being shown in end-on reverse of its normal position in the assembled camera) it will be seen that when the cog-wheel 67 is thus locked, that the cog-wheel 79, which is in spur-gear therewith, is also immobile. This cog-wheel 79 (Fig. 4) and the sprocket wheel 30 (Fig. 3) are mounted on a common spindle and move in unison.

After the outward pull on knob 100 and the release of the lock-pin 61' at 61, through the lifting action of the flange-disk 98 upon the arms 65' and 65'' of the lever 65, and in turn upon the prong 64, the knurled knob 100 may be slightly turned so that the take-up spool 25 will pull the ribbon and actuate the mechanism through its action upon sprocket wheel 30, while sprocket wheel 31 idles.

The rotation of the sprocket 30 is caused by the traction of ribbon film 29 as it is being reeled upon the take-up spool 25 by the manipulation of the knob 100. Thus when the lock-pin 61' of the lock-spring 59 is in locking engagement, the knob 100 cannot be turned for advancement of the ribbon-film, until after it and the flange-disk 98 have been lifted by the upward drawing motion as previously described.

The indicator disc 68 is spatially and firmly mounted upon the cog-wheel 67 on a common axis and revolves in unison therewith. In the space between the planes of 67 and 68 are firmly set a number of perpendicular studs 82 (in the mechanism illustrated, four in number), positioned near the rim of 68, and adapted to engage the near end of the lever 83 which is slidably mounted upon fulcrum 84, a flare in the lever bar being provided with a slot 85 permitting a limited longitudinal movement as may be required to shift the one lever arm in or out of engagement with the studs 82 and appropriately and cooperatively to shift the signal "flag" 87 and a stop lug 86, at the other end of the lever 83. The function of the lug 86 is to act as a safety stop to lock the shutter release button 15 after each exposure and until fresh unexposed film has been moved into position. As the film is moved by appropriate manipulation of the knob 100, by first lifting to release the locking mechanism and then turning, the cog-wheel 67 rotates under the traction of the film ribbon over sprocket wheel 30, and with it the indicator disc 68, in such amplitude to present one of the exposure indicator numerals 96 through a rimmed opening 96' in the top cover 1. This indicates the number of the view of the periodically recurring series of four views as previously explained.

In the drawings (Figs. 1 and 4) it is shown that the camera is now set for snapping the second picture out of such a series of four. This is indicated to the operator by the figure "2" visible through the rimmed opening 96' in the top cover 1. That the camera is now set for another "take," is also shown by an appropriate signal color (say green) of the signal "flag" 87 visible through the aperture 88. This color signal also indicates that the lock-lug 86 has been moved out of locking engagement with the flange of shutter release-button 15 for operation.

After the shutter release button 15 has been depressed and an exposure made, new film is advanced for further exposure, thus rotating the cog-wheel 67 until the next hole or indentation is engaged by the lock-pin 61' of the lock spring 59. This occurs at short intervals until the last hole 63 is released when a longer rotatory movement takes place and continues until the first hole 60 of the given new series again comes into the position of engagement by lock-pin 61' in the same manner as is now shown at 61 in the drawings.

Furthermore, as the cog-wheel 67 advances by short intervals, another one of the studs 82 again engages the near end of the arm of lever 83 and moves it upwardly and also correspondingly moves the signal "flag" 87 and the stop lug 86 in the opposite direction, thus changing the color or other insignia visible through 88, and disengaging the stop lug 86 from under the flange of the shutter release button 15 to permit its free operation.

During the revolution of the cog-wheel 67, as it makes its long rotatory movement, after release of the lock pin of lock spring 59 from lock hole 63 to continue until hole 60 is again engaged by the lock pin of lock spring 59, a pin-stud 69, integral with and projecting from the under side of 67, engages and depresses the curved shoe at the free end of lever arm 70. This lever arm is pivoted on 70' (which is also the axis of the ratchet wheel 73), and by overcoming the resistance of the light-pressure wire spring 71, thrusts the spring pawl 72 against the ratchets of toothed wheel 73, which then also revolves an indicator disc 74, 75, mounted thereon. This indicator disc is visible as 75 through the framed opening 97 in the top box cover 1. The marker 76 upon 75 shows how much total film has been consumed, by its position in relation to the pointer 77. The spring click 78 prevents a contrary motion of ratchet wheel 73 as the spring pawl 72 is returned to normal position after the stud-pin 69 has passed beyond the position where it has depressed the lever 70.

As already partly indicated, the lever 83, when its one end is engaged with one of the studs 82, is also carried forward with the rotation of 67 thus overcoming the light-tension springs 94 and 101, acting at the other arm and pushing down the end carrying the signal "flag" 87 and the stop lug 86 to withdraw the latter from beneath the flange of the shutter button 15, and to permit the free functional operation of that button. This mechanism is shown in Fig. 4, as in position which permits the depression of the shutter-release button 15. A circular flange on button 15 also engages the tongue-flange 89 at the end of and supported by an upwardly pressing light spring 90. As the button 15 is depressed, it also depresses the tongue-flange 89, overcoming the light tension of spring 90 at the end of which the tongue-flange 89 is mounted. The depression of this flange 89 in turn actuates a wire crank lever (which is partly shown at 92) held in position by a brace fulcrum 93. One arm of this crank lever 92 is turned angularly under the tongue flange 89 and the other arm is turned upwardly at an angle of about 90° so that it engages the side of the signal "flag" 87. These parts are so arranged and disposed that when the release button 15 is pressed, and thus also acts upon the lever 92 and the signal-flag 87, the lever 83 will be drawn over along its slot 85 on the fulcrum bearing 84 and thus withdraw the lever 83 out of its engagement with any given stud 82, at the other end of lever 83. The light spring 94 will then cause the lever 83 to turn on its fulcrum sufficiently to cause the lock-lug 86 to pass under the ring flange of the shutter-release button 15 as soon as the latter is relieved from digital pressure. At the same time the signal "flag" 87 is also moved sufficiently in the same direction to present a different color, say red, at the window 88.

After the pressure on the button 15 has been released, then the light bent-wire spring 101 pressing against a boss 104 again pushes the lever 83 in the opposite direction along the slot 85, with respect to its fulcrum 84 bearing, and places the opposite free arm of the lever 83 in a position for re-engagement with another advancing stud 82 as the cog-wheel 67 is again set into motion by appropriate manipulation of the knurled knob 100 and the movement of ribbon film over sprocket wheel 30. This cycle of operations is then repeated with every "take" and resetting of the film as heretofore explained.

Figs. 5 and 6 present a plan of a section of the side wall 40 of the inner supporting frame 3 (left hand side with respect to plan shown in Fig. 4). Fig. 6 shows the plan with the lower portion of the camera box cover in position, while Fig. 5 presents the same section with this cover part removed. Taken together these two figures illustrate the function of a pin 54 in releasing the lock-spring 59 by action of lever 57 when the lower section 2, 2' of the box cover is removed, as for recharging with new film.

In Fig. 3, 46' is an arm extension of the shutter mechanism (not shown) protruding from within the exposure chamber and provided with a deep notch into which a lock-prong 46 may sink for temporarily locking the shutter (when shutter-set knob 10 and stem 10' have been pulled outwardly) to hold it in cocked position (as shown in Fig. 3) and further adapted to contact the end of the arm 48 while the shutter is being cocked and thus to push the flange 48' out of locking engagement with the lug 18, freeing the latter to respond to the pressure of release button 15.

In Figs. 1, 3, and 4, are shown, rotatable diaphragm setters and controls, 5 and 6, on the lens mountings being made to cooperate in unison by a connecting rod 49, whereby the diaphragm-aperture behind both lenses may be set to the same diaphragm stops according to the stop-scale (not shown) set between the lens mounts and as determined by the position of the marker 49' on the connecting rod with relation to the scale.

In Fig. 1, the numerals 7 and 8 show two members of a view finder, collapsibly mounted on the camera box cover 1 by springs 9, 8 being a lens and 7 a viewing frame which is provided with crossed hair-lines for centering the field; 105 is a lock spring to hold the lens down on cover when not in use for sighting.

The rod 17, fixedly mounted on sliding plate 19, is carried under lug 18 at the end of the resilient arm 45 immobilizing the snap-shot mechanism when the time-setter knob 11 has been pulled out, and drawing with it the sliding plate 19 together with attached parts (17, 20). The rod 20, also firmly mounted on plate 19, relieves upward pressure on flexible rod 17 at its hooked end 17' so that this hooked end may engage the upturned lug 16 on shutter-operating lever 12 to prevent its full return and thus to keep the shutters open for time exposure.

After exposure of the roll of film it is developed and printed or processed by known methods so that the pictures may be viewed as positives by transmitted light. In the case exemplified, the ribbon is thereafter cut into appropriate lengths to include eight "frames" comprising two sets of four spaced pairs. These related pairs are indicated in Fig. 7 by the lettering A A', etc., on the mounted film 202.

The film strips are then appropriately mounted for stereoscopic viewing in an oblong card-board or metal slide 201 into which a longitudinal window has been cut and into which the paired sections of film 202 may be set for viewing by transmitted light.

The window and the cut film strip may be placed somewhat off center and nearer toward one end, thus leaving a wider margin at the other end, as shown in Fig. 7, for better manual control. For convenient mounting by the amateur, the slide may be formed from two evenly sized and cut-out sheets, superimposed, with the film strip properly placed in the window between them and the two sheets glued or stapled together.

As will be seen from the strip of film as mounted in the slide, the picture of each frame has its altitude lying transversely of the linear course of the ribbon of film (in the same manner as the letters of designation) and with each twin frame being the fourth from its companion, when, as illustrated, there are four doubles to a slide set.

In the form of stereoscope adapted for viewing the new form of stereoscopic slide 201, derived from the camera as heretofore described, there is a housing comprising a shallow oblong pan-shaped receptacle 208 and a detachable gable-shaped cover 207 for closure of the housing as shown in the top plan view in Fig. 9. The internal mechanism and parts are illustrated in Fig. 8 in plan view of the interior after the cover 207 has been removed.

The mounted slide 201 is inserted at its right end (as shown) into an opening at the end 208' of the housing 208, and is guided and limited in its motion by a telescoping member 204. A convenient and effective method of illuminating the slides is shown in Fig. 8, whereby a light bulb 215 is set into its socket 216 which is connected with a source of electric power, either flash light batteries or a converter plug, within the hollow cylindrical handle 211 shown in fraction.

The wiring for the lighting circuit 213 is provided with a contact mechanism 214, 214' for closing the light circuit when the slide 201 has been advanced far enough into the interior of the housing 208 to place the first pair of stereo-pictures 202 (say D' and D) into alignment with the respective openings 203 in the wall of 208' of the housing member 208. (Only one of these openings is shown in Figure 8 at the position where the slide 201 has been fragmented to permit its showing.)

The twin viewing lenses and eye pieces 210 are mounted on tubes (not separately shown) which are telescoped within the sleeves 209, the latter being longitudinally slotted for the protrusion of the pair of racks 205'', integral with the movable inner tubes, whereby the latter may be adjusted for focusing through the cooperative action of a pair of pinions and supporting rod 205' controlled by turning of the knob 205. For further accommodation to the sight of different eye-spacings, as may be desirable, a slidable perforated disc (not shown in detail) may be placed behind either one of the twin eye-piece lenses and controlled in its inward and outward movement, as for instance by a bent arm 206' saddled over the shank of knurl-headed thumb-nut riding on a threaded stem as illustrated at 206.

In order to obtain a maximum of well dispersed light from the illuminating bulb 215, and for nonglaring light-transmission through the transparent film pictures, it is desirable that the inner aspect of the cover 207 be provided with white reflecting surfaces placed at appropriate angles according to known principles for the desired effect. The cover 207 is removably attached to the main body of the housing 208 by insertion into a groove under a ledge 218 the other end being held in place by the pressure of a resilient member 217.

We claim:

1. A twin-lens stereo camera comprising, in combination, a housing, a frame within said housing for containing and supporting an exposure chamber provided with a pair of apertures in register with the lens-mountings spaced at normal interocular distance, a film-track running lengthwise through said exposure chamber and adapted to permit passage therethrough of a cinema ribbon film; means for guiding said film, including sprocket-wheels for engaging the perforations at the margin of the film; a spool for feeding the film through the exposure chamber and to a rotatable take-up spool for collecting and storing the film, after passage through the exposure chamber, and adapted to exert traction upon the ribbon film; means for intermittently limiting the forward movement of the film, including a cog-wheel set to revolve in unison with one of the sprocket-wheels as the film passes thereover, said cog-wheel being in spur-gear with a master cog-wheel which latter is provided upon its flat disc body with a series of four openings in arcuate alignment with the rim of the said wheel and being distanced from each other in a spacial ratio of 1:1:1:5 to the point of beginning, such openings being adapted to engage successively with a lock-pin under action of a pressure member normally set to force the said lock-pin into one of the said openings as each passes successively thereunder; means for raising such lock-pin out of locking engagement with the master cog-wheel, including a lever member actuated from without by manipulation of a protruding handle, the said handle being slidably splined within the axis of the take-up spool and adapted to be moved upwardly to act upon said lever member for releasing the said lock-pin from its then engagement and thereafter to impart a winding movement to the take-up spool until the latter has taken up sufficient more film to effect rotation of the master cog-wheel and until said lock-pin is again forced into engagement therewith; automatic means for locking the shutter trigger after each depression including a stop-lug adapted to be drawn under the trigger by a light pressure member as the trigger returns to normal operative position, and reciprocal means for unlocking and resetting the shutter trigger including a lever member longitudinally shiftable upon its fulcrum interacting between the shutter operating mechanism and the master cog-wheel and having mounted thereon the shutter-trigger stop-lug at one end and adapted at the other end to slip into and out of engagement with studs on the master cog-wheel adapted to act upon the slidable lever to withdraw the stop-lug from the shutter operating mechanism concurrently with the advancement of new film into exposure position; externally visible caution signals comprising indicia mounted upon the slidable lever near the end carrying the shutter-stop lug and movable in unison therewith; externally visible signal means to indicate the number of the pair of film frames in situ comprising markings upon the upper aspect of the master cog-wheel and serially presented to view with the progressive rotation thereof; and means for indicating the total amount of film consumed including an externally visible scale caused to register by a pawl actuated by the successive revolutions of the master cog-wheel.

2. A twin-lens stereo camera comprising, in combination, a housing, a frame within said housing for containing and supporting an exposure chamber provided with a pair of apertures in register with the lens-mountings spaced at normal interocular distance, a film-track running length-wise through said exposure chamber and adapted to permit passage therethrough of a cinema ribbon film; means for guiding said film, including sprocket-wheels for engaging the perforations at the margin of the film; a spool for feeding the film through the exposure chamber and to a rotatable take-up spool for collecting and storing the film, after passage through the exposure chamber, and adapted to exert traction upon the ribbon film; means for intermittently limiting the forward movement of the film, including a cog-wheel set to revolve in unison with one of the sprocket wheels as the film passes thereover, said cog-wheel being in spur-gear with a master cog-wheel which latter is provided upon its flat disc body with a series of four openings in arcuate alignment with the rim of said wheel and being distanced from each other in a spatial ratio of 1:1:1:5 to the point of beginning, such openings being adapted to engage successively with a lock-pin under action of a pressure member normally set to force the said lock-pin into the said openings as each passes successively thereunder; means for raising such lock-pin out of locking engagement with the master cog-wheel, including a lever member actuated from without by manipulation of a protruding handle, the said handle being slidably splined within the axis of the take-up spool and adapted to be moved upwardly to act upon said lever member for releasing the said lock-pin from its then engagement and thereafter to impart a winding movement to the take-up spool until the latter has taken up sufficient more film to effect rotation of the master cog-wheel and until said lock-pin is again forced into engagement therewith.

3. A twin-lens stereo camera comprising, in combination, a housing, a frame within said housing for containing and supporting an exposure chamber provided with a pair of apertures in register with the lens-mountings spaced at normal interocular distance, a film-track running lengthwise through said exposure chamber and adapted to permit passage therethrough of a cinema ribbon film; means for guiding said film, including sprocket-wheels for engaging the perforations at the margin of the film; a spool for feeding the film through the exposure chamber and to a rotatable take-up spool for collecting and storing the film, after passage through the exposure chamber, and adapted to exert traction upon the ribbon film; means for intermittently limiting the forward movement of the film, including a cog-wheel set to revolve in unison with one of the sprocket-wheels as the film passes thereover, said cog-wheel being in spur-gear with a master cog-wheel which latter is provided upon its flat disc body with a series of four openings in arcuate alignment with the rim of said wheel and being distanced from each other in a spatial ratio of 1:1:1:5 to the point of beginning, such openings being adapted to engage successively with a lock-pin under action of a pressure member normally set to force the said lock-pin into the said openings as each passes successively thereunder; means for raising such lock-pin out of locking engagement with the master cog-wheel, including a lever member actuated from without by manipulation of a protruding handle, the said handle being slidably splined within the axis of the take-up spool and adapted to be moved upwardly to act upon said lever member for releasin the said lock-pin from its then engagement and thereafter to impart a winding movement to the take-up spool until the latter has taken up sufficient more film to effect rotation of the master cog-wheel and until said lock-pin is again forced into engagement therewith; automatic means for locking the shutter-trigger after each depression, including a stop-lug adapted to be drawn under the trigger by a light pressure member as the trigger returns to normal operative position, and reciprocal means for unlocking and resetting the shutter trigger, including a lever member longitudinally shiftable upon its fulcrum interacting between the shutter operating mechanism and the master cog-wheel, and having mounted thereon the shutter-trigger stop-lug at one end and adapted at the other end to slip into and out of engagement with studs on the master cog-wheel adapted to act upon the slidable lever to withdraw the stop-lug from the shutter-operating mechanism concurrently with the advance of new film into exposure position.

4. A twin-lens stereo camera as described in claim 3, further characterized by means for providing externally visible caution signals including indicia mounted upon the slidable lever near the end carrying the shutter-stop lug and movable in unison therewith.

5. A twin-lens stereo camera as described in claim 2, further characterized by means for providing externally visible signals to indicate the number of the pair of film frames in situ, including markings upon the upper aspect of the master cog-wheel and serially presented to view with the progressive rotation thereof.

FRANKLIN H. AVERS.
EDWARD C. KREBS.